US009009782B2

(12) United States Patent
Myla et al.

(10) Patent No.: US 9,009,782 B2
(45) Date of Patent: Apr. 14, 2015

(54) STEERING TRAFFIC AMONG MULTIPLE NETWORK SERVICES USING A CENTRALIZED DISPATCHER

(71) Applicants: John Myla, Santa Clara, CA (US); Srinivasa R. Addepalli, San Jose, CA (US)

(72) Inventors: John Myla, Santa Clara, CA (US); Srinivasa R. Addepalli, San Jose, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 51 days.

(21) Appl. No.: 13/970,535

(22) Filed: Aug. 19, 2013

(65) Prior Publication Data

US 2015/0052575 A1    Feb. 19, 2015

(51) Int. Cl.
*H04L 29/06* (2006.01)
*H04L 12/721* (2013.01)

(52) U.S. Cl.
CPC .............. *H04L 63/20* (2013.01); *H04L 45/566* (2013.01); *H04L 63/0227* (2013.01); *H04L 63/0263* (2013.01); *H04L 63/10* (2013.01)

(58) Field of Classification Search
CPC ..... H04L 63/20; H04L 63/10; H04L 63/0227; H04L 63/0263
USPC ........................................................... 726/1
See application file for complete search history.

(56) References Cited

U.S. PATENT DOCUMENTS

| 5,426,637 | A | 6/1995 | Derby et al. |
| 5,764,895 | A | 6/1998 | Chung |
| 6,279,113 | B1 * | 8/2001 | Vaidya ............................ 726/23 |
| 6,408,391 | B1 * | 6/2002 | Huff et al. ....................... 726/22 |
| 7,555,774 | B2 * | 6/2009 | Hall et al. ....................... 726/22 |
| 7,725,938 | B2 * | 5/2010 | Cothrell et al. ................. 726/23 |
| 8,191,141 | B2 * | 5/2012 | Suit et al. ........................ 726/23 |
| 2004/0172557 | A1 * | 9/2004 | Nakae et al. .................. 713/201 |
| 2005/0005031 | A1 * | 1/2005 | Gordy et al. .................. 709/250 |
| 2007/0044142 | A1 * | 2/2007 | Yoon et al. ........................ 726/3 |
| 2007/0058551 | A1 * | 3/2007 | Brusotti et al. ............... 370/241 |
| 2007/0230470 | A1 | 10/2007 | Mahamuni |
| 2010/0132028 | A1 * | 5/2010 | Wang et al. .................... 726/11 |
| 2012/0084460 | A1 | 4/2012 | McGinnity et al. |
| 2012/0110641 | A1 * | 5/2012 | Parker et al. ..................... 726/4 |

* cited by examiner

*Primary Examiner* — Michael S McNally
(74) *Attorney, Agent, or Firm* — VanLeeuwen & VanLeeuwen; Jonathan N. Geld

(57) ABSTRACT

A network service dispatcher is provided that transparently navigates network traffic through network service appliances utilizing sub-session connection information generated in accordance with policies pertaining to a client-server session. The network service dispatcher intercepts a first data packet of a new session between two computer systems and generates sub-session connection information that navigates the data packet through one or more network service appliances in a manner transparent to the client or server. In turn, the network service dispatcher utilizes the sub-session connection information to navigate subsequent forward or reverse data packets in the session without performing a policy-based search for each data packet.

20 Claims, 8 Drawing Sheets

STEERING TRAFFIC AMONG MULTIPLE NETWORK SERVICES USING A CENTRALIZED DISPATCHER

TECHNICAL FIELD

The present disclosure relates to steering network traffic among multiple network services using a centralized network service dispatcher. More particularly, the present disclosure relates to transparently navigating network traffic through network service appliances utilizing sub-session connection information corresponding to a client-server session.

BACKGROUND

Computer networks are increasingly becoming more intelligent, such as data center networks, enterprise networks, service provider networks, and the like. Network services such as intrusion detection systems/intrusion prevention systems (IDS/IPS), web proxies, application firewalls, wide area network (WAN) optimization, application delivery control systems (ADC), and server load balancing system (SLB) are added to computer networks to add protection, adaptability, and performance to the computer networks.

These network services may be implemented in a computer network as a virtual appliance or physical appliance. When a network service appliance is added to or removed from a computer network, the computer network topology changes and administrators are required to re-configure the network infrastructure to ensure a complete traffic flow connection exists between clients and servers.

In some instances, data traffic passes through each network service appliance, regardless of the traffic type and/or the network service appliance type (e.g., in a serial manner), thus consuming unnecessary processing cycles. For example, a compression network service appliance may still receive and forward data packets that do not require compression.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

This disclosure provides a method of transparently navigating network traffic through network service appliances utilizing sub-session connection information. A network service dispatcher intercepts a data packet of a new session between two computer systems and generates the sub-session connection information in accordance with policies pertaining to the two computer systems. In turn, the network service dispatcher utilizes the sub-session connection information to navigate subsequent forward or reverse data packets in the session without performing a policy-based search for each data packet. As such, for each data packet in a session, the network service dispatcher replaces processing-intense policy-based searching with less expensive hash-based searching to fulfill required network services of a session. Furthermore, the network service dispatcher allows addition or removal of network service appliances to a computer network seamlessly without disturbing the computer network's topology. In one embodiment, the network service dispatcher provides intelligent traffic steering across various types of network service appliances based on network zones associated with virtual local area networks.

Figure 1:
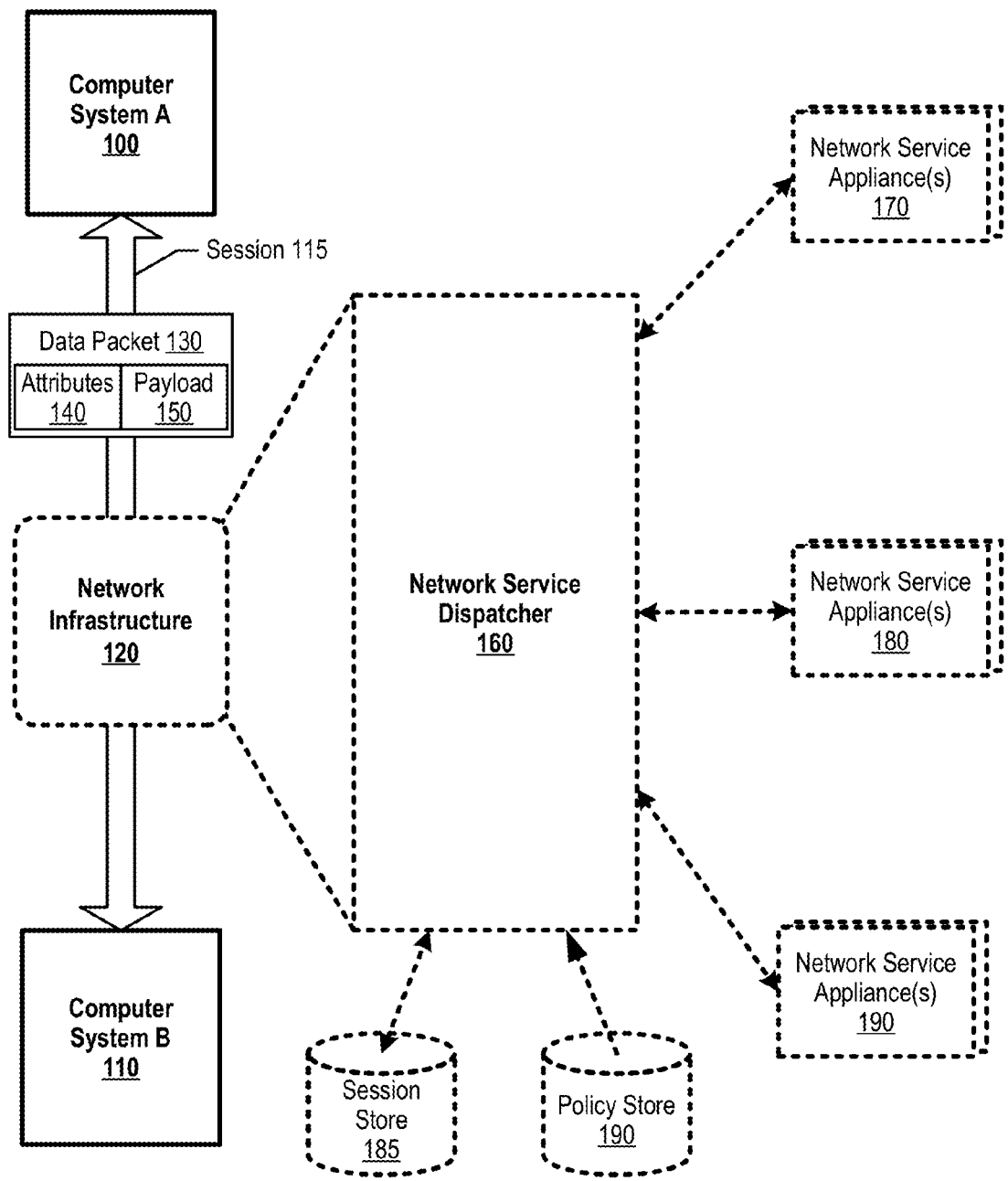
FIG. 1 is a diagram depicting a computer system initiating a session to send data through a network infrastructure that includes a network service dispatcher.

FIG. 1 is a diagram depicting one example of a computer system initiating a session to send data through a network infrastructure that includes a network service dispatcher. Computer system A 100 (e.g., a client, network node, etc.) initiates session 115 with computer system B 110 (e.g., a client, network node, etc.) by sending data packet 130 to computer system B 110 (e.g., a server) over network infrastructure 120. Data packet 130 includes session attributes 140, such as a 5-tuple that includes computer system A 100's IP address and port number (source IP address/Port number); computer system B 110's IP address and port number (destination IP address/Port number), and a protocol corresponding to session 115.

Network infrastructure 120 includes network service dispatcher 160, which is transparent to computer system A 100 and computer system B 110. Network service dispatcher 160 intercepts data packet 130 and checks previous session information located in session store 185 to determine whether data packet 130 belongs to an existing session or is the start of a new session. In one embodiment, network service dispatcher 160 generates a hash using session attributes 140, and compares the hash with session identifiers included in session store 185 to make such determination. In one embodiment, network service dispatcher 160 may be a network service dispatcher module (hardware, software, or a combination of hardware and software) that executes on an information handling system, such as information handling system 700 shown in FIG. 7.

When network service dispatcher 160 does not locate matching session information in session table 185, thus indicating a new session, network service dispatcher 160 accesses policy store 190 to identify polices corresponding to sending data between computer system A 100 and computer system B 110. For example, a policy may require data packet 130 to pass through a compression network service appliance and a firewall network service appliance before being sent to computer system B 110.

Based upon the identified policies, network service dispatcher 160 generates one or more sets of "sub-session connection information" to navigate data packet 130 through network service appliances 170 and/or 180, and/or 190 accordingly. In one embodiment, the sub-session connection information is maintained in a forward session link list that is stored in session store 185. Network service dispatcher 160 creates a session entry that includes a forward session identifier of session 115 (e.g., the hash value of session attributes 140), and also a forward session link list pointer that points to the forward session link list (see FIG. 4 and corresponding text for further details).

As a result, when computer system A 100 sends a subsequent data packet over session 115, network service dispatcher 160 matches the hash of the subsequent data packet's session attributes with the new session entry and, in turn, retrieves the sub-session connection information to navigate the subsequent data packet through network service appliances 170, and/or 180, and/or 190 accordingly.

In one embodiment, network service dispatcher 160 creates a reverse session entry and one or more reverse sets of sub-session connection information, which is utilized to navigate data packets that are received from computer system B 110 with a destination at computer system A 100. In this embodiment, network service dispatcher 160 generates a reverse session identifier by switching the attributes of computer system A 100 with computer system B 110 prior to generating a reverse hash (e.g., computer system B 110 is the source computer system and computer system A 100 is the destination computer system). Network service dispatcher 160 also generates a reverse session link list that includes sub-session connection information in reverse order of the forward session link list (see FIG. 4 and corresponding text for further details).

Figure 2:
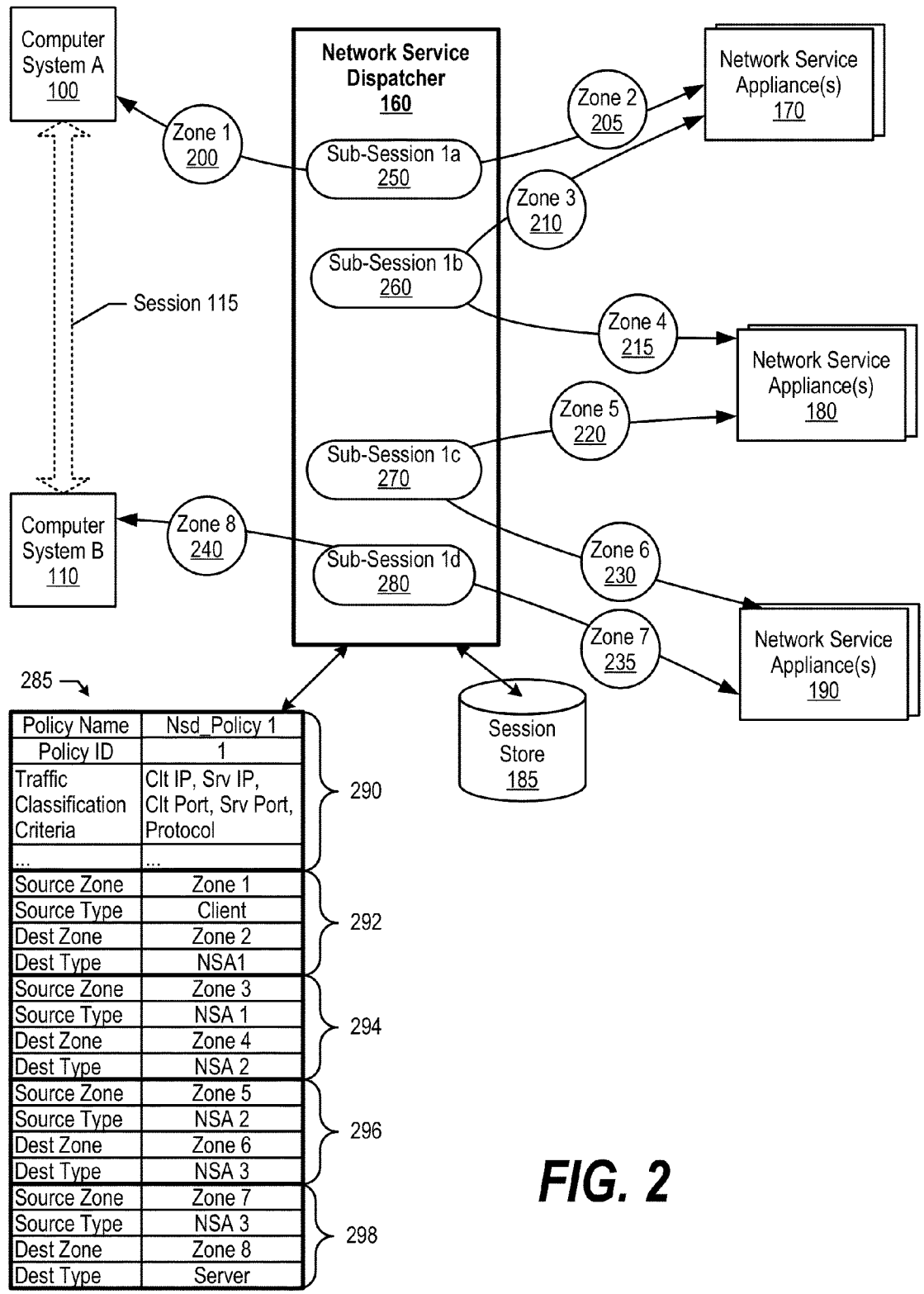
FIG. 2 is a diagram depicting a network service dispatcher navigating a data packet through multiple network service appliances based upon multiple sets of sub-session connection information.

FIG. 2 is a diagram depicting a network service dispatcher navigating a data packet through multiple network service appliances based upon multiple sets of sub-session connection information. As discussed in FIG. 1, when network service dispatcher 160 receives a first data packet (data packet 130) corresponding to a new session (session 115) between a source computer system and a destination computer system, network service dispatcher 160 accesses policy table 190 to locate a corresponding policy and generate sub-session connection information accordingly.

FIG. 2 shows an example where network service dispatcher 160 locates policy 285 that corresponds with session 115. Policy 285 is generated by, for example, a system administrator and includes policy parameters 290 that identify the policy name, policy ID, and one or more sets of traffic classification criteria. Network service dispatcher compares the new data packet's session information (5-tuple) against the traffic classification criteria (5-tuple) in policy 285 to determine a match.

In one embodiment, policy parameters 290 may include multiple sets of traffic classification criteria, such as one set corresponding to a session between client X and server Z, and another set corresponding to a session between client Y and server Z. In this embodiment, multiple sessions may be supported through a single policy. In another embodiment, the traffic classification criteria may include broad parameters, such as "all client IP addresses."

Figure 6:
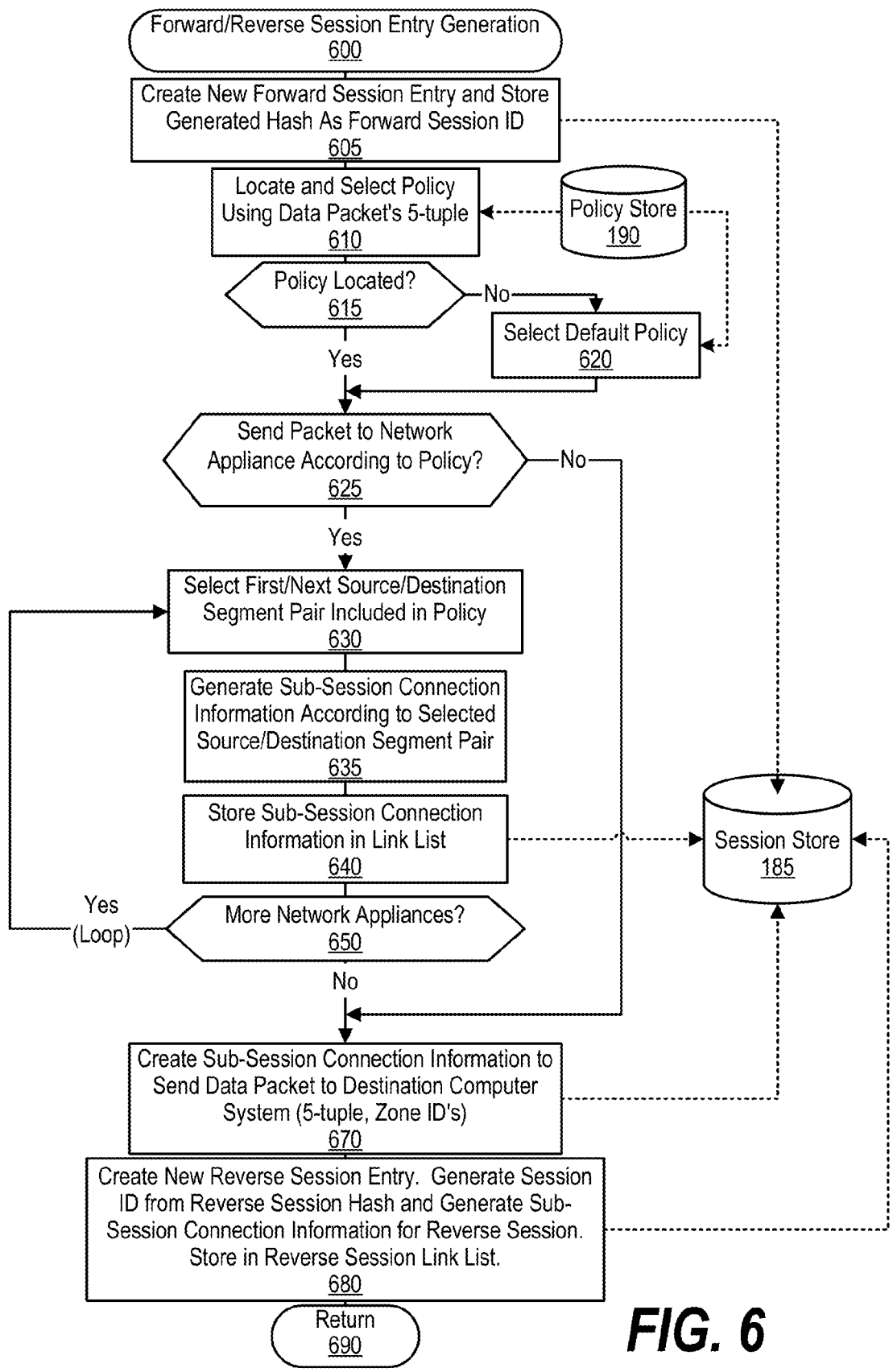
FIG. 6 is a flowchart showing steps taken in a network service dispatcher generating session entry information and sub-session connection information for a client-server session.

Policy 285 also includes source/destination segment pairs 290-292, 294, 296, and 298, which the network service dispatcher utilizes to create individual sub-session connection information (see FIG. 6 and corresponding text for further details). Each source/destination segment pair includes a source zone (e.g., VLAN between source and network service dispatcher 160), a source type (client, server, network service appliance), a destination zone (e.g., VLAN between network service dispatcher 160 and destination), and a destination type (client, server, network service appliance). In one embodiment, the zones described herein are virtual local area networks that operate on a data link layer of a computer network (Layer 2 of the OSI model).

For each of the four source/destination segment pairs 292-298, network service dispatcher 160 creates sub-session connection information for a corresponding sub-session connection. The sub-session connection information includes the corresponding sub-session's zones and 5-tuple information for each of the sub-session's two connected systems. As such, network service dispatcher 160 selects source/destination segment pair 292 and creates sub-session connection information for sub-session 1a 250, which utilizes zone 1 200 to communicate with computer system A 100 and zone 2 205 to communicate with network service appliance 170. Network service dispatcher 160 selects source/destination segment pair 294 and creates sub-session connection information for sub-session 1b 260, which utilizes zone 3 to communicate with network service appliance 170 and zone 4 215 to communicate with network service appliance 180. Network service dispatcher 160 selects source/destination segment pair 296 and creates sub-session connection information for sub-session 1c 250, which utilizes zone 5 220 to communicate with network service appliance 180 and zone 6 230 to communicate with network service appliance 190. And, network service dispatcher 160 selects source/destination segment pair 298 and creates sub-session connection information for sub-session 1d 280, which utilizes zone 7 235 to communicate with network service appliance 190 and zone 8 240 to communicate with computer system B 110.

In one embodiment, network service dispatcher 160 may re-use sub-session connection information of a client-server connection for other client-server connections, such as when policy 285 includes multiple sets of traffic classification criteria and a new data packet's session information matches one of the other sets of traffic classification criteria.

Network service dispatcher 160 stores the session information and sub-session connection information in session store 185. In one embodiment, the sub-session connection information may be categorized as a first endpoint set of sub-session connection information (sub-session 1a 250), a second endpoint set of sub-session connection information (sub-session 1d 280), and intermediate sets of sub-session connection information (sub-session 1b 260 and sub-session 1c 270).

Figure 4:
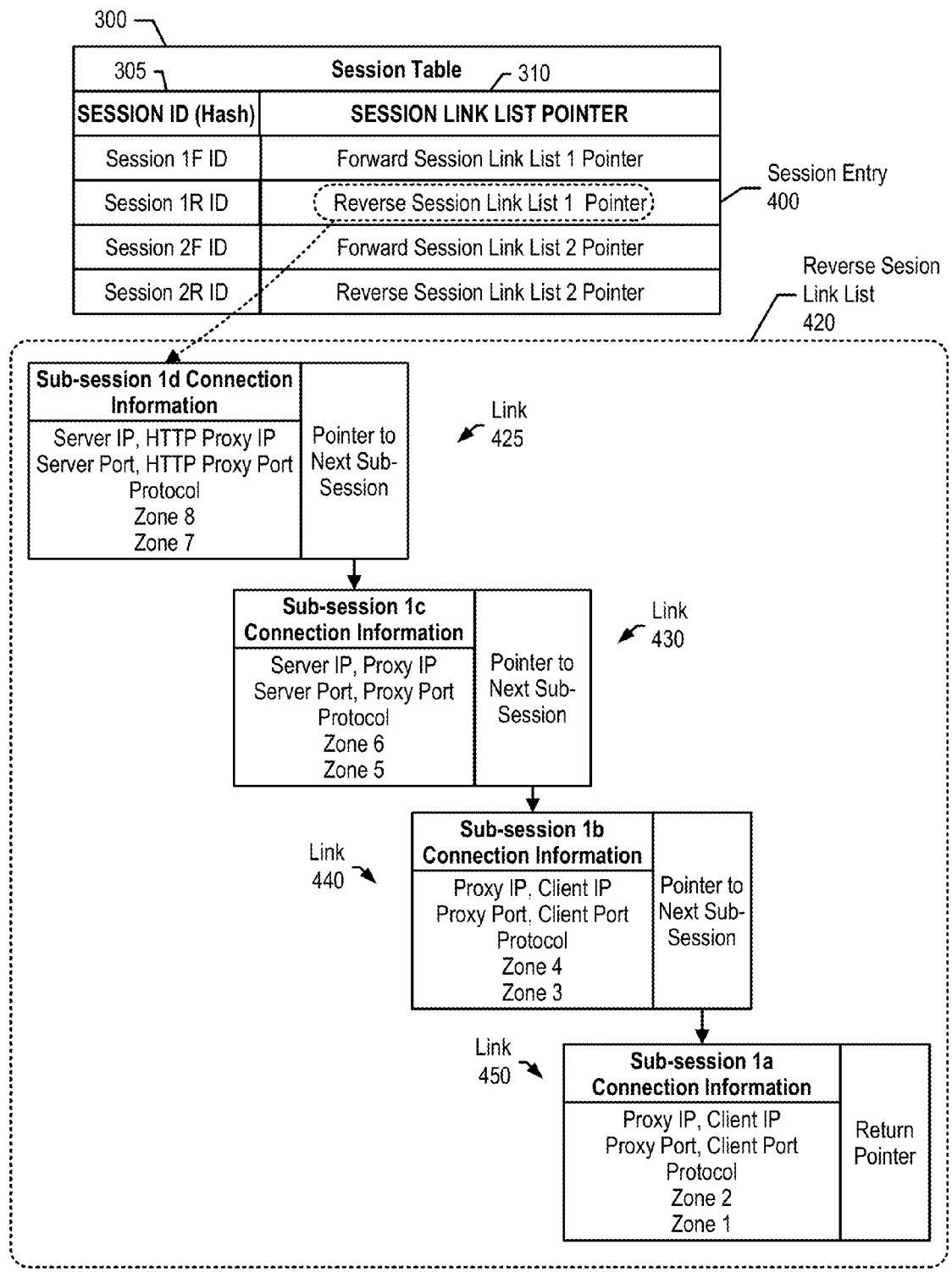
FIG. 4 is a diagram depicting a session table and a corresponding reverse session link list.

In another embodiment, network service dispatcher 160 stores session entries and sub-session connection information in session store 185 for session 115's "reverse" data packet flow (packets traveling from computer system B 110 to computer system A 100, see FIG. 4 and corresponding text for further details). As such, network service dispatcher 160 utilizes the information stored in session store 185 to navigate forward and reverse data packets in session 115 through network service appliances 170-190 without repeatedly accessing policies pertaining to the session.

Figure 3:
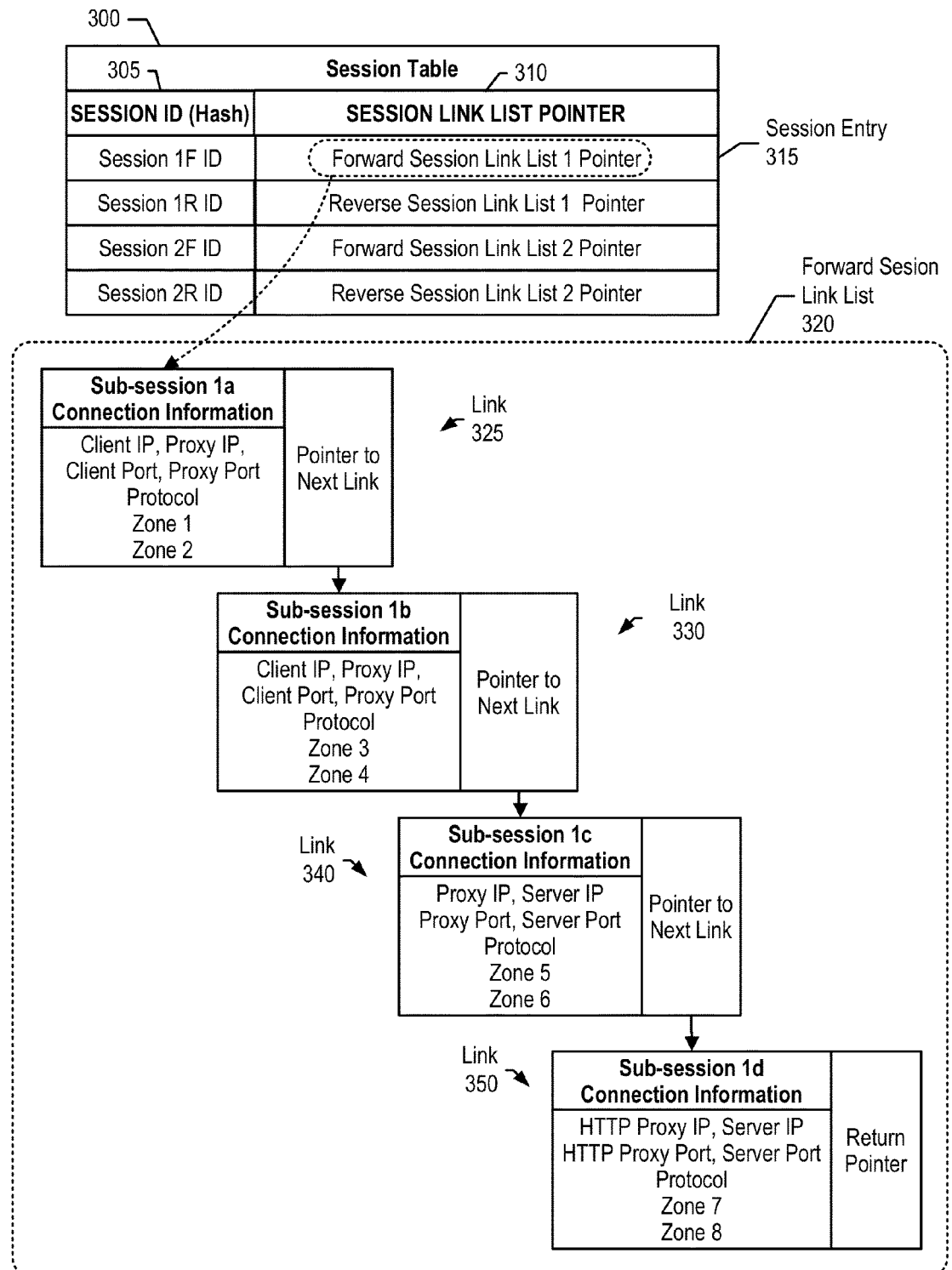
FIG. 3 is a diagram depicting a session table and a corresponding forward session link list.

FIG. 3 is a diagram depicting one example of a session table that includes forward and reverse session entries for various sessions. Session table 300 includes session entry information in columns 305-310 for sessions between source computer systems and destination computer systems. Column 305 includes session identifiers, which are hash values of session attributes of a session. Column 310 includes session link list pointers that point to a particular link list.

FIG. 3 shows session entry 315, which corresponds to the forward session between computer system A 100 and computer system B 110 shown in FIG. 2. Session entry 315's session identifier "Session 1F," in one embodiment, is a hash generated from data packet 130's 5-tuple. As such, when network service dispatcher 160 receives a data packet in the same forward session, network service dispatcher 160 matches the data packet's 5-tuple hash with "Session 1F" and uses the forward session link list pointer in session entry 315 to locate forward session link list 320.

Forward session link list 320 is one example of a forward session linked list structure that includes links 325, 330, 340, and 350, each including a set of sub-session connection information. Referring to FIG. 2, link 325 includes sub-session connection information generated from source/destination segment pair 292 for sub-session 1a 250. As can be seen, the sub-session connection information includes identifiers for zones 1 and 2, which are assigned by network service dispatcher 160 (e.g., via zone assignment circuitry included in the network service dispatcher). In turn, network service dispatcher 160 uses sub-session 1a's connection information included in link 325 to navigate the data packet from computer system A 100 to network service appliance 170. Since the data packet is sent to other network service appliances, link 325's pointer points to the next link (link 330).

Link 330 includes sub-session connection information generated from source/destination segment pair 294 for sub-session 1b 260, which includes identifiers for zones 3 and 4. In turn, network service dispatcher 160 uses sub-session 1b's connection information included in link 330 to navigate the data packet from network service appliance 170 to network service appliance 180. Since the data packet is sent to other network service appliances, link 330's pointer points to the next link (link 340).

Link 340 includes connection information generated from source/destination segment pair 296 for sub-session 1c 270, which includes identifiers for zones 5 and 6. In turn, network service dispatcher 160 uses sub-session 1c's sub-session connection information included in link 340 to navigate the data packet from network service appliance 180 to network service appliance 190. Link 340's pointer points to the next link (link 350).

Link 350 includes connection information generated from source/destination segment pair 298 for sub-session 1d 280, which is a sub-session between network service appliance 190 and computer system B 110. The connection information includes identifiers for zones 7 and 8. In turn, network service dispatcher 160 uses sub-session 1d's connection information included in link 350 to route the data packet from network service appliance 190 to computer system B 110. Since link 350 completes the sub-sessions included in the overall session between computer system A 100 and computer system B 110, link 350's pointer is a return pointer.

The example in FIG. 3 shows a "forward session link list," which corresponds to sending data packets from computer system A 100 to computer system B 110. Network service dispatcher 160 also automatically generates a "reverse session link list" when it generates the forward session link list, which corresponds to sending data packets from computer system B 110 to computer system A 100. The reverse session link list uses similar sub-session connection information shown in FIG. 3, but in reverse order (see FIG. 4 and corresponding text for further details).

FIG. 4 is a diagram depicting one example of a session entry that points to a reverse session link list. FIG. 4 shows session entry 400 that corresponds to a reverse session of session 115. Session entry 400 includes a session identifier that is a "reverse hash" of session attributes 140 (computer system B 110 is source and computer system A 100 is destination). As such, when network service dispatcher 160 receives a data packet for session 115 in the reverse direction, network service dispatcher 160 matches the data packet's 5-tuple hash with "Session 1R" and uses the corresponding reverse session pointer in session entry 400 to locate reverse session link list 420.

Reverse session link list 420 is an example of a reverse session linked list that includes links 425, 430, 440, and 450, each including a set of sub-session connection information. Link 400 includes connection information for sub-session 1d 280. The connection information includes identifiers for zones 8 and 7 along with source/destination information (opposite order of link 350's sub-session connection information shown in FIG. 3). In turn, network service dispatcher 160 uses sub-session 1d's connection information included in link 425 to navigate the data packet from computer system B 110 to network service appliance 190. Since the data packet is sent to other network service appliances, link 425's pointer points to the next link corresponding to the next sub-session (link 430).

Link 430 includes connection information for sub-session 1c 270, which is a sub-session between network service appliance 190 and network service appliance 180. The connection information includes identifiers for zones 6 and 5 along with source/destination information (opposite order of link 340's sub-session connection information shown in FIG. 3). In turn, network service dispatcher 160 uses sub-session 1c's connection information included in link 430 to navigate the data packet from network service appliance 190 to network service appliance 180. Since the data packet is sent to other network service appliances, link 430's pointer points to the next sub-session (link 440).

Link 440 includes connection information for sub-session 1b 260, which is a sub-session between network service appliance 180 and network service appliance 170. The connection information includes identifiers for zones 4 and 3 along with source/destination information (opposite order of link 330's sub-session connection information shown in FIG. 3). In turn, network service dispatcher 160 uses sub-session 1b's connection information included in link 440 to route the data packet from network service appliance 180 to network service appliance 170. Link 440's pointer points to the next sub-session link (link 450).

Link 450 includes connection information for sub-session 1a 250, which is a sub-session between network service appliance 170 and computer system A 100. The connection information includes identifiers for zones 2 and 1 along with source/destination information (opposite order of link 325's sub-session connection information shown in FIG. 3). In turn, network service dispatcher 160 uses sub-session 1a's connection information included in link 450 to route the data packet from network service appliance 170 to computer system A 100. Since link 450 completes the sub-sessions included in the overall reverse session between computer system B 110 and computer system A 100, link 450's pointer is a return pointer.

Figure 5:
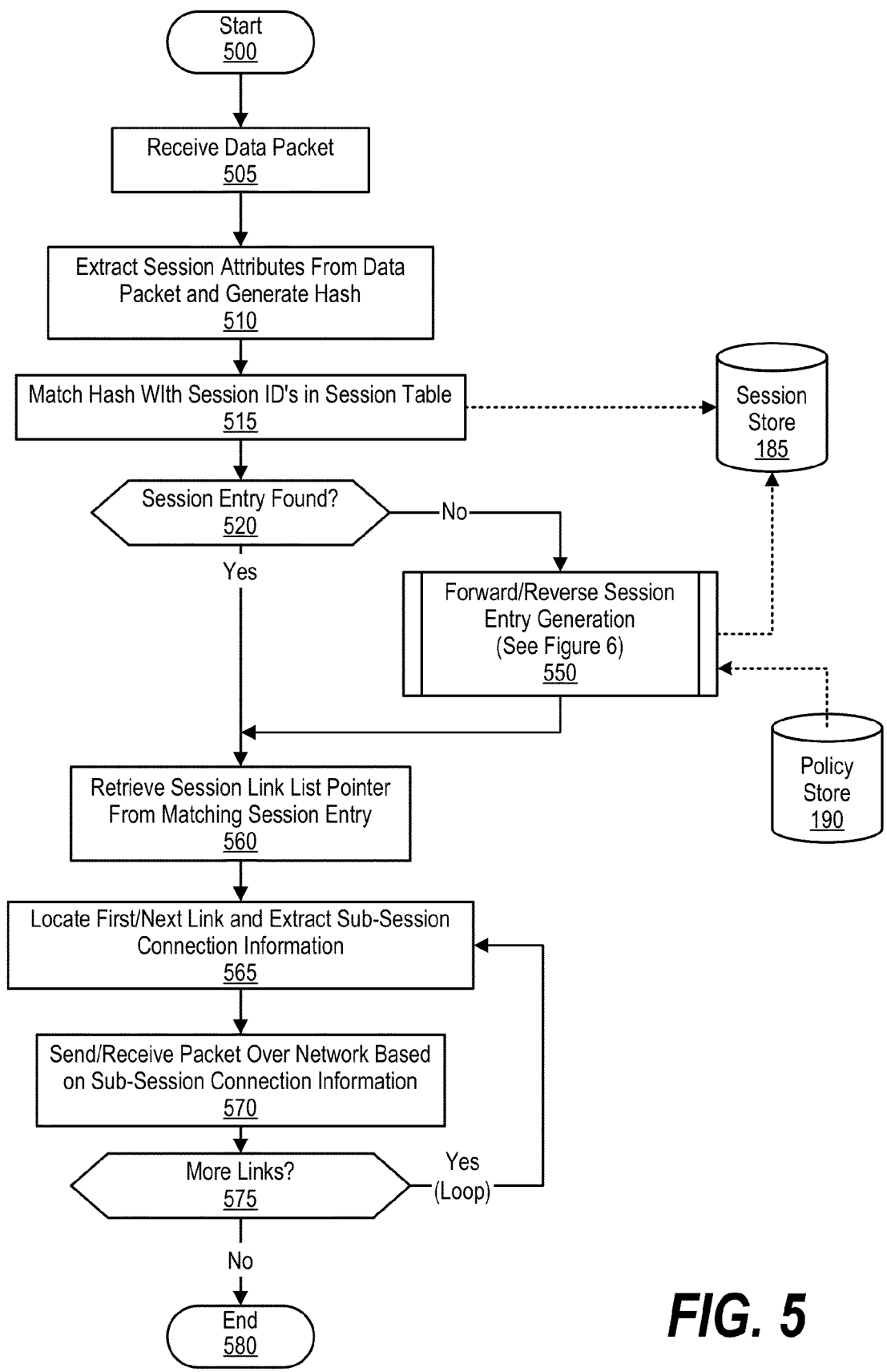
FIG. 5 is a flowchart showing steps taken in a network service dispatcher receiving a data packet and generating/utilizing session entry information to navigate the data packet accordingly.

FIG. 5 is a flowchart showing steps taken in the network service dispatcher receiving a data packet and generating/utilizing session entry information to navigate the data packet to various network service appliances. Processing commences at 500, whereupon the network service dispatcher receives a data packet sent over the computer network (e.g., via a communication interface) (505). Referring to FIG. 1, network service dispatcher 160 intercepts data packet 130 transmitted by computer system A 100. The network service dispatcher extracts session attributes from the data packet and generates a hash using the extracted session attributes (e.g., via hash generation circuitry included in the network service dispatcher) (510). In one embodiment, the session attributes include a source IP address, a destination IP address, a source port, a destination port, and a protocol.

At 515, the network service dispatcher compares the hash with session identifiers located in a session entry table stored in session store 185 (e.g., via a comparison circuitry included in the network service dispatcher). In one embodiment, instead of searching the session entry table, the network service dispatcher traverses a link list to match the generated hash with a session identifier.

A determination is made as to whether the network service dispatcher matched the hash with one of the stored session identifiers, thus indicating that the data packet is not the first data packet in a particular session (decision 520). If a match occurs, decision 520 branches to the "Yes" branch, bypassing a new session creation process.

On the other hand, if the network service dispatcher did not find a match, decision 520 branches to the "No" branch, whereupon the network service dispatcher looks up policies in policy store 190 (e.g., using 5-tuple information in the data packet) and creates a forward and reverse session entry, along with corresponding sub-session connection information, for the data packet's session (pre-defined process block 550, see FIG. 6 and corresponding text for further details). In one embodiment, the network service dispatcher uses a default policy to create the sub-session connection information when the network service dispatcher does not locate a policy that matches the data packet's session information (5-tuple). In this embodiment, the network service dispatcher may also send a notification message to a system administrator indicating that a matching policy was not located for the session.

At 560, the network service dispatcher retrieves a session link list pointer from the matching (or newly created) session entry (see FIG. 4 and corresponding text for further details). The network service dispatcher uses the session link list pointer to locate the corresponding link list and extract the first set of sub-session connection information from the first link (565). The network service dispatcher navigates the data packet over the computer network to a receiving system according to the sub-session connection information, such as by adding virtual local area network (VLAN) information/header (e.g., via a transmission interface included in the network service dispatcher) (570). For example, the network service dispatcher may send the data packet from a source computer system to a first network service appliance (e.g., data compressor).

A determination is made as to whether there are more links in the link list, indicating to send the data packet to other network service appliances or the destination computer system (decision 575). If the selected link's pointer points to another link, decision 575 branches to the "Yes" branch, which loops back to select and process the next link's set of sub-session connection information. This looping continues until there are no more links to process, at which point decision 575 branches to the "No" branch whereupon processing ends at 580.

FIG. 6 is a flowchart showing steps taken in the network service dispatcher generating session entry information and sub-session connection information for a session. When the network service dispatcher receives a data packet for a new session, the network service dispatcher creates a forward session entry, a reverse session entry, and corresponding sub-session connection information for the session. In turn, when the network service dispatcher receives subsequent data packets corresponding to the same session (forward or reverse), the network service dispatcher uses the sub-session connection information to navigate the data packet to network service appliances and the data packet's destination accordingly.

When the network service dispatcher receives a new data packet and determines that a session entry has not yet been created (decision 520, FIG. 5), the network service dispatcher performs steps in FIG. 6 to create new session information. Processing commences at 600, whereupon the network service dispatcher creates a new forward session entry in the session entry table, and stores the generated hash (from FIG. 5) in the new forward session entry (605).

The network service dispatcher uses the data packet's session information (e.g., 5-tuple) to locate and select a corresponding policy in policy store 190 (e.g., via a policy identification circuitry included in the network service dispatcher) (610). A determination is made as to whether the network service dispatcher located a policy corresponding to the data packet's session information (decision 615). If the network service dispatcher did not locate a corresponding policy, decision 615 branches to the "No" branch, whereupon, in one embodiment, the network service dispatcher selects a default policy for which to generate sub-session connection information (620). For example, a default policy may indicate sending all data packets through a firewall. On the other hand, if the network service dispatcher located a corresponding policy, decision 615 branches to the "Yes" branch to use the corresponding policy in the sub-session connection information process (discussed below).

The network service dispatcher determines, based upon the source/destination segment pairs included in the selected policy (corresponding or default), whether to send the data packet to one or more network service appliances or to send the data packet directly to the destination computer system (decision 625). For example, the policy may include one source/destination segment pair that indicates to send the data packet from a client to a server (no network service appliance processing required) (see FIG. 2 and corresponding text for further details).

If the policy indicates to send the data packet directly to the destination computer system, decision 625 branches to the "No" branch, bypassing sub-session connection information generation steps for network service appliance routing.

On the other hand, if the policy indicates to the network service dispatcher to send the data packet to a network service appliance, decision 625 branches to the "Yes" branch, whereupon the network service dispatcher selects the first source/destination segment pair included in the policy (630) (e.g., via segment pair circuitry included in the network service dispatcher, see FIG. 2 and corresponding text for further details).

The network service dispatcher uses information included in the selected source/destination segment pair to create a set of sub-session connection information, which includes zone identifiers; IP addresses and ports of the two computing entities corresponding to the sub-session (e.g., computer system A 100 and network service appliance 170); and the protocol to use during the sub-session (e.g., via sub-session generation circuitry included in the network service dispatcher, see FIG. 3 and corresponding text for further details) (635).

The network service dispatcher, at 640, stores the set of sub-session connection information in a link of a forward session link list stored in session store 185 (e.g., via link generation circuitry included in the network service dispatcher), and a determination is made as to whether the policy indicates to send the data packet to more network service appliances (e.g., another source/destination segment pair corresponding to another network service appliance) (decision 650). If the policy indicates to send the data packet to other network service appliances (e.g., firewall), decision 650 branches to the "Yes" branch, which loops back to identify the next network service appliance and generate another set of sub-session connection information accordingly. This looping continues until the network service dispatcher has created sub-session connection information for each network service appliance required by the policies, at which point decision 650 branches to the "No" branch.

At 670, the network service dispatcher creates a final set of sub-session connection information using the source/destination segment pair corresponding to the destination system (e.g., source/destination segment pair 298 shown in FIG. 2). The network service dispatcher stores the final set of sub-session connection information in the last link of the forward session link list stored in session store 185.

The network service dispatcher also automatically creates reverse session information based upon the forward session information and stores the reverse session information in session store 185 (680). The reverse session information includes a reverse session hash that is stored as a reverse session identifier, a reverse session link list that includes reverse sets of sub-session connection information, and a reverse session pointer that points to the reverse session link list (see FIG. 4 and corresponding text for further details). Processing returns at 690.

According to one aspect of the present disclosure, a network service dispatcher receives a data packet from a first computer system that includes session attributes identifying the first computer system and a second computer system. The network service dispatcher identifies policies corresponding to the session attributes and generates sets of sub-session connection information accordingly. In turn, the network service dispatcher sends the data packet to the one or more network service appliances based upon generated sets of sub-session connection information.

According to another aspect of the present disclosure, the network service dispatcher generates a hash value from the session attributes and stores the hash value in a forward session entry included in a session table. The network service dispatcher then links the forward session entry to the sets of sub-session connection information.

According to yet another aspect of the present disclosure, the network service dispatcher receives a subsequent data packet from the first computer system that includes subsequent session attributes identifying the first computer system and the second computer system. The network service dispatcher generates a subsequent hash from the subsequent session attributes and matches the subsequent hash to the hash value included in the forward session entry. As a result, the network service dispatcher retrieves the sets of sub-session connection information and sends the subsequent data packet to one or more network service appliances based upon the retrieved sets of sub-session connection information.

According to yet another aspect of the present disclosure, the network service dispatcher selects a source/destination segment pair included in one of the policies and identifies a first network service appliance based upon the selected source/destination segment pair. The network service dispatcher assigns a first zone connecting the first computer system to the network service dispatcher, and assigns a second zone connecting the network service dispatcher to the first network service appliance. In turn, the network service dispatcher includes a first zone identifier (corresponding to the first zone) and a second zone identifier (corresponding to the second zone) in one of the sets of sub-session connection information.

According to yet another version of the present disclosure, the network service dispatcher generates reverse sets of sub-session connection information based upon the sets of sub-session connection information. The reverse sets of sub-session connection information correspond to sending data from the second computer system to the first computer system. In turn, the network service dispatcher stores the reverse sets of sub-session connection information in a reverse session link list, and generates a reverse hash of the session attributes that is based upon changing attributes corresponding to the first computer system with attributes corresponding to the second computer system. The network service dispatcher then stores the reverse hash and a reverse session link list pointer in a reverse session entry.

According to yet another version of the present disclosure, the network service dispatcher receives a subsequent data packet from the second computer system that includes subsequent session attributes identifying the second computer system and the first computer system. The network service dispatcher generates a subsequent hash of the subsequent session attributes, and matches the subsequent hash to the reverse session entry. In turn, the network service dispatcher retrieves the reverse sets of sub-session connection information and sends the subsequent data packet to one or more of the network service appliances based upon the reverse sets of sub-session connection information.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program, in a non-transitory fashion, for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
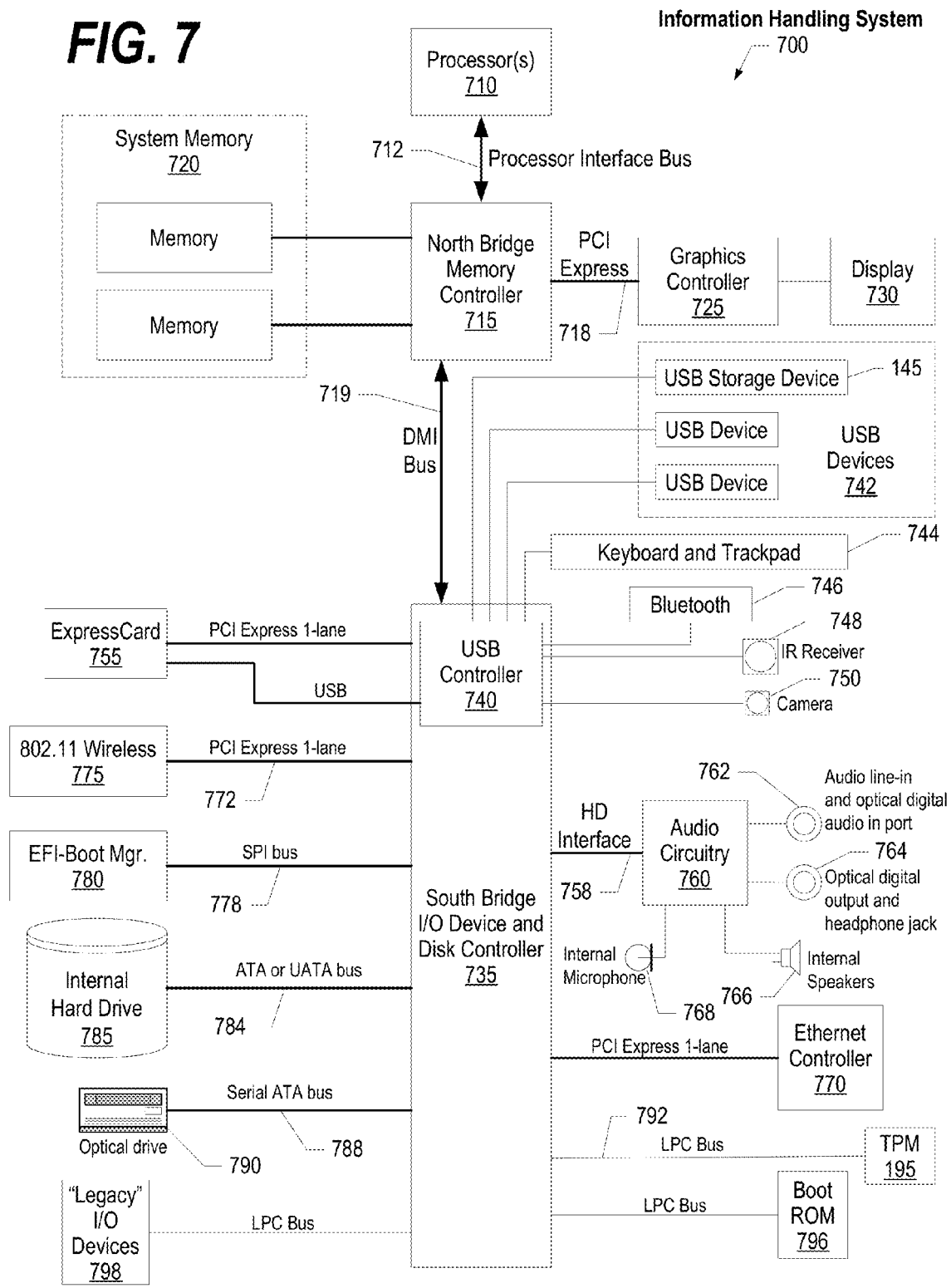
FIG. 7 illustrates a simplified example of a computer system capable of performing the computing operations described herein.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etceteras.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 8:
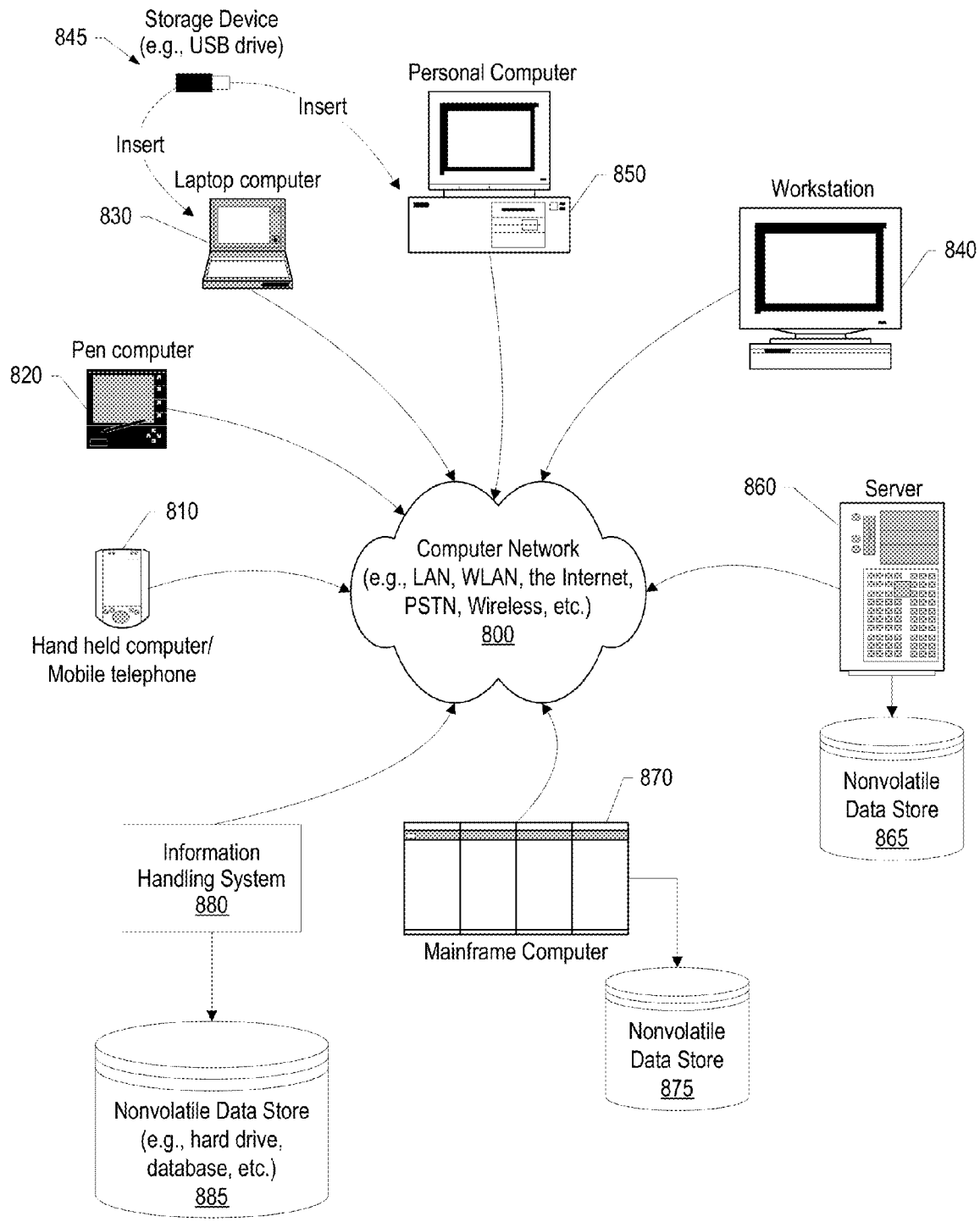
FIG. 8 provides an extension of the information handling system environment shown in FIG. 7 to illustrate that the methods described herein can be performed on a wide variety of information handling systems that operate in a networked environment.

FIG. 8 provides an extension of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    receiving a data packet from a first computer system at a network service dispatcher system, wherein the data packet includes session attributes identifying the first computer system and a second computer system;
    identifying, by the network service dispatcher, one or more policies that correspond to sending the data packet between the first computer system and the second computer system;
    generating, by the network service dispatcher, one or more sets of sub-session connection information corresponding to the identified one or more policies, wherein at least one of the one or more sets of sub-session connection information correspond to sending the data packet to one or more network service appliances prior to sending the data packet to the second computer system;
    generating a forward session entry that includes a session identifier based upon the session attributes, wherein the forward session entry links the session identifier to the one or more sets of sub-session connection information; and
    sending, by the network service dispatcher, the data packet to the one or more network service appliances based upon the forward session entry.

2. The method of claim 1 further comprising:
    generating a hash value of the session attributes included in the data packet; and
    storing the hash value as the session identifier in the forward session entry stored in a session table.

3. The method of claim 2 further comprising:
    receiving, at the network service dispatcher, a subsequent data packet from the first computer system, wherein the subsequent data packet includes subsequent session attributes identifying the first computer system and the second computer system;
    generating, by the network service dispatcher, a subsequent hash of the subsequent session attributes;
    matching, by the network service dispatcher, the subsequent hash to the hash value included in the forward session entry;
    retrieving, by the network service dispatcher, the one or more sets of sub-session connection information in response to the matching; and
    sending, by the network service dispatcher, the subsequent data packet to the one or more network service appliances based upon the retrieved one or more sets of sub-session connection information.

4. The method of claim 2 further comprising:
    storing each of the one or more sets of sub-session connection information in one of one or more links included in a forward session link list, wherein the forward session entry includes a forward session link list pointer that points to the forward session link list.

5. The method of claim 4 wherein the generating of the one or more sets of sub-session connection information further comprises:
selecting a source/destination segment pair included in a selected one of the one or more policies;
identifying a first network service appliance from the one or more network service appliances based upon the selected source/destination segment pair;
assigning a first zone that connects the first computer system to the network service dispatcher, and assigning a second zone that connects the network service dispatcher to the first network service appliance, wherein the first zone and the second zone are virtual local area networks;
including a first zone identifier and a second zone identifier in a first set of the one or more sets of sub-session connection information, the first zone identifier corresponding to the first zone and the second zone identifier corresponding to the second zone; and
storing the first set of sub-session connection information in one of the one or more links included in the forward session link list.

6. The method of claim 5 wherein the selected policy comprises:
a plurality of traffic classification criteria sets, wherein at least one the plurality of traffic classification criteria sets matches the session attributes included in the data packet; and
a plurality of source/destination segment pairs corresponding to a plurality of the one or more network service appliances, the selected source/destination segment pair included in the plurality of source/destination segment pairs.

7. The method of claim 4 further comprising:
generating, by the network service dispatcher, one or more reverse sets of sub-session connection information based upon the one or more sets of sub-session connection information, wherein the one or more reverse sets of sub-session connection information corresponds to sending data from the second computer system to the first computer system;
storing the one or more reverse sets of sub-session connection information in a reverse session link list;
generating a reverse hash of the session attributes, wherein the reverse hash is based upon changing attributes corresponding to the first computer system with attributes corresponding to the second computer system; and
storing the reverse hash and a reverse session link list pointer in a reverse session entry, the reverse session link list pointer pointing to the reverse session link list.

8. The method of claim 7 further comprising:
receiving a subsequent data packet from the second computer system, wherein the subsequent data packet includes subsequent session attributes identifying the second computer system and the first computer system;
generating a subsequent hash of the subsequent session attributes;
matching the subsequent hash to the reverse session entry;
retrieving the one or more reverse sets of sub-session connection information in response to the matching; and
sending the subsequent data packet to one or more of the network service appliances based upon the retrieved one or more reverse sets of sub-session connection information.

9. The method of claim 1 wherein the one or more sets of sub-session connection information include:
a first endpoint set of sub-session connection information that corresponds to the first computer system and one of the one or more network service appliances;
a second endpoint set of sub-session connection information that corresponds to the second computer system and one of the one or more network service appliances; and
one or more intermediate sets of sub-session connection information, wherein each of the one or more intermediate sets of sub-session connection information correspond to two of the network service appliances.

10. The method of claim 1 wherein the received data packet fails to include address information corresponding to the network service dispatcher system.

11. A network service dispatcher comprising:
one or more processors;
one or more memories accessible by at least one of the processors;
a communication interface that receives a data packet from a first computer system and provides the data packet to at least one of the one or more processors, the data packet including session attributes identifying the first computer system and a second computer system;
policy identification circuitry utilized by at least one of the processors to identify one or more policies corresponding to sending the data packet between the first computer system and the second computer system;
sub-session generation circuitry utilized by at least one of the processors to generate one or more sets of sub-session connection information corresponding to the identified one or more policies, wherein at least one of the one or more sets of sub-session connection information correspond to sending the data packet to one or more network service appliances prior to sending the data packet to the second computer system;
forward session generation circuitry utilized by at least one of the processors to generate a forward session entry that includes a session identifier based upon the session attributes, wherein the forward session entry links the session identifier to the one or more sets of sub-session connection information; and
a transmission interface that sends the data packet from the network service dispatcher to the one or more network service appliances based upon the forward session entry.

12. The network service dispatcher of claim 11 further comprising:
hash generation circuitry utilized by at least one of the processors to generate a hash value of the session attributes included in the data packet; and
storage circuitry utilized by at least one of the processors to store the hash value as the session identifier in the forward session entry stored in a session table.

13. The network service dispatcher of claim 12 further comprising:
the communication interface that receives a subsequent data packet from the first computer system and provides the subsequent data packet to at least one of the one or more processors, the subsequent data packet including subsequent session attributes identifying the first computer system and the second computer system;
the hash generation circuitry utilized by at least one of the processors to generate a subsequent hash of the subsequent session attributes;
comparison circuitry utilized by at least one of the processors to match the subsequent hash to the hash value included in the forward session entry;

retrieval circuitry utilized by at least one of the processors to retrieve the one or more sets of sub-session connection information in response to the matching; and the transmission interface that sends the subsequent data packet to the one or more network service appliances based upon the retrieved one or more sets of sub-session connection information.

14. The network service dispatcher of claim 12 further comprising:

segment pair circuitry to select a source/destination segment pair included in a selected one of the one or more policies;

network service appliance identification circuitry utilized by at least one of the processors to identify a first network service appliance from the one or more network service appliances based upon the selected source/destination segment pair;

zone assignment circuitry utilized by at least one of the processors to assign a first zone that connects the first computer system to the information handling system, and assign a second zone that connects the information handling system to the first network service appliance, wherein the first zone and the second zone are virtual local area networks;

the sub-session generation circuitry utilized by at least one of the processors to include a first zone identifier and a second zone identifier in a first set of the one or more sets of sub-session connection information, the first zone identifier corresponding to the first zone and the second zone identifier corresponding to the second zone; and the storage circuitry utilized by at least one of the processors to store the first set of sub-session connection information in one of one or more links included in a forward session link list, wherein the forward session entry includes a forward session link list pointer that points to the forward session link list.

15. The network service dispatcher of claim 14 wherein the selected policy comprises:

a plurality of traffic classification criteria sets, wherein at least one the plurality of traffic classification criteria sets matches the session attributes included in the data packet; and a plurality of source/destination segment pairs corresponding to a plurality of the one or more network service appliances, the selected source/destination segment pair included in the plurality of source/destination segment pairs.

16. The network service dispatcher of claim 12 further comprising:

the sub-session generation circuitry utilized by at least one of the processors to generate one or more reverse sets of sub-session connection information based upon the one or more sets of sub-session connection information, wherein the one or more reverse sets of sub-session connection information corresponds to sending data from the second computer system to the first computer system;

the storage circuitry utilized by at least one of the processors to store the one or more reverse sets of sub-session connection information in a reverse session link list;

the hash generation circuitry utilized by at least one of the processors to generate a reverse hash of the session attributes, wherein the reverse hash is based upon changing attributes corresponding to the first computer system with attributes corresponding to the second computer system; and the storage circuitry utilized by at least one of the processors to store the reverse hash and a reverse session link list pointer in a reverse session entry, the reverse session link list pointer pointing to the reverse session link list.

17. The network service dispatcher of claim 16 further comprising:

the communication interface that receives a subsequent data packet from the second computer system and provides the subsequent data packet to at least one of the one or more processors, wherein the subsequent data packet includes subsequent session attributes identifying the second computer system and the first computer system;

the hash generation circuitry utilized by at least one of the processors to generate a subsequent hash of the subsequent session attributes;

comparison circuitry utilized by at least one of the processors to match the subsequent hash to the reverse session entry;

retrieval circuitry utilized by at least one of the processors to retrieve the one or more reverse sets of sub-session connection information in response to the matching; and the transmission interface that sends the subsequent data packet to one or more of the network service appliances based upon the retrieved one or more reverse sets of sub-session connection information.

18. A system comprising:

a plurality of network nodes, the plurality of network nodes including a first network node and a second network node;

a plurality of network service appliances; and a network service dispatcher that generates sub-session connection information based upon one or more policies in response to receiving a data packet sent from the first network node with a target destination at the second network node, wherein the network service dispatcher generates a forward session entry that includes a session identifier based upon the session attributes, the forward session entry linking the session identifier to the one or more sets of sub-session connection information, and wherein the network service dispatcher sends the data packet to at least one of the plurality of network service appliances based upon the forward session entry.

19. The system of claim 18 wherein the data packet corresponds to a first session between the first network node and the second network node, and wherein the network service dispatcher re-uses the sub-session connection information to direct one or more subsequent data packets belonging to the first session to at least one of the plurality of network service appliances prior to sending the one or more subsequent data packets to the second network node.

20. The system of claim 19 wherein the network service dispatcher generates reverse sub-session connection information based upon the sub-session connection information, and wherein the network service dispatcher uses the reverse sub-session connection information to direct one or more reverse data packets belonging to the first session to at least one of the plurality of network service appliances, the one or more reverse data packets sent from the second network node with a destination at the first network node.

* * * * *